United States Patent [19]

Tracey et al.

[11] Patent Number: 5,756,946
[45] Date of Patent: May 26, 1998

[54] FLEXIBLE MOUNTING OF A MOTOR SECONDARY IN A LINEAR INDUCTION MOTOR FOR DRIVING ELEVATOR CAR DOORS

[75] Inventors: Michael J. Tracey, Cromwell; James A. Rivera, Bristol, both of Conn.

[73] Assignee: Otis Elevator Company, Farmington, Conn.

[21] Appl. No.: 746,275

[22] Filed: Nov. 7, 1996

[51] Int. Cl.⁶ .................. B66B 13/14; E05C 7/06; H02K 41/00
[52] U.S. Cl. .................. 187/316; 187/284; 187/313; 310/12; 49/118
[58] Field of Search .................. 187/313, 315, 187/316, 289; 310/12, 13; 49/120, 118, 117

[56] References Cited

U.S. PATENT DOCUMENTS

| | | | |
|---|---|---|---|
| 1,881,014 | 10/1932 | Ayers | 49/118 |
| 1,881,016 | 10/1932 | Rose | 49/360 |
| 1,881,017 | 10/1932 | Jacobson | 49/358 |
| 1,916,491 | 7/1933 | Rose | 49/409 |
| 3,612,395 | 10/1971 | English | 310/12 |
| 4,698,876 | 10/1987 | Karita | 16/102 |
| 4,876,765 | 10/1989 | Karita | 16/102 |
| 5,134,324 | 7/1992 | Sakagami et al. | 310/12 |
| 5,172,518 | 12/1992 | Yoshino | 49/360 |
| 5,373,120 | 12/1994 | Barrett et al. | 187/316 |
| 5,612,518 | 3/1997 | Jaminet et al. | 187/316 |

FOREIGN PATENT DOCUMENTS

| | | | |
|---|---|---|---|
| 29613605U1 | 11/1996 | Germany. | |
| 61-135357 | 6/1986 | Japan | 310/12 |
| 541766 | 5/1977 | Russian Federation. | |

Primary Examiner—Robert Nappi

[57] ABSTRACT

A linear induction motor for opening and closing elevator car doors in an elevator system includes a motor primary fixedly attached to a door hanger and a motor secondary flexibly mounted to a header bracket of the elevator car. A pair of swivel joints secure the ends of the motor secondary to the header bracket. The swivel joints compensate for misalignment and twisting of the elevator car doors by allowing multi-dimensional movement of the motor secondary relative to the header bracket.

6 Claims, 5 Drawing Sheets

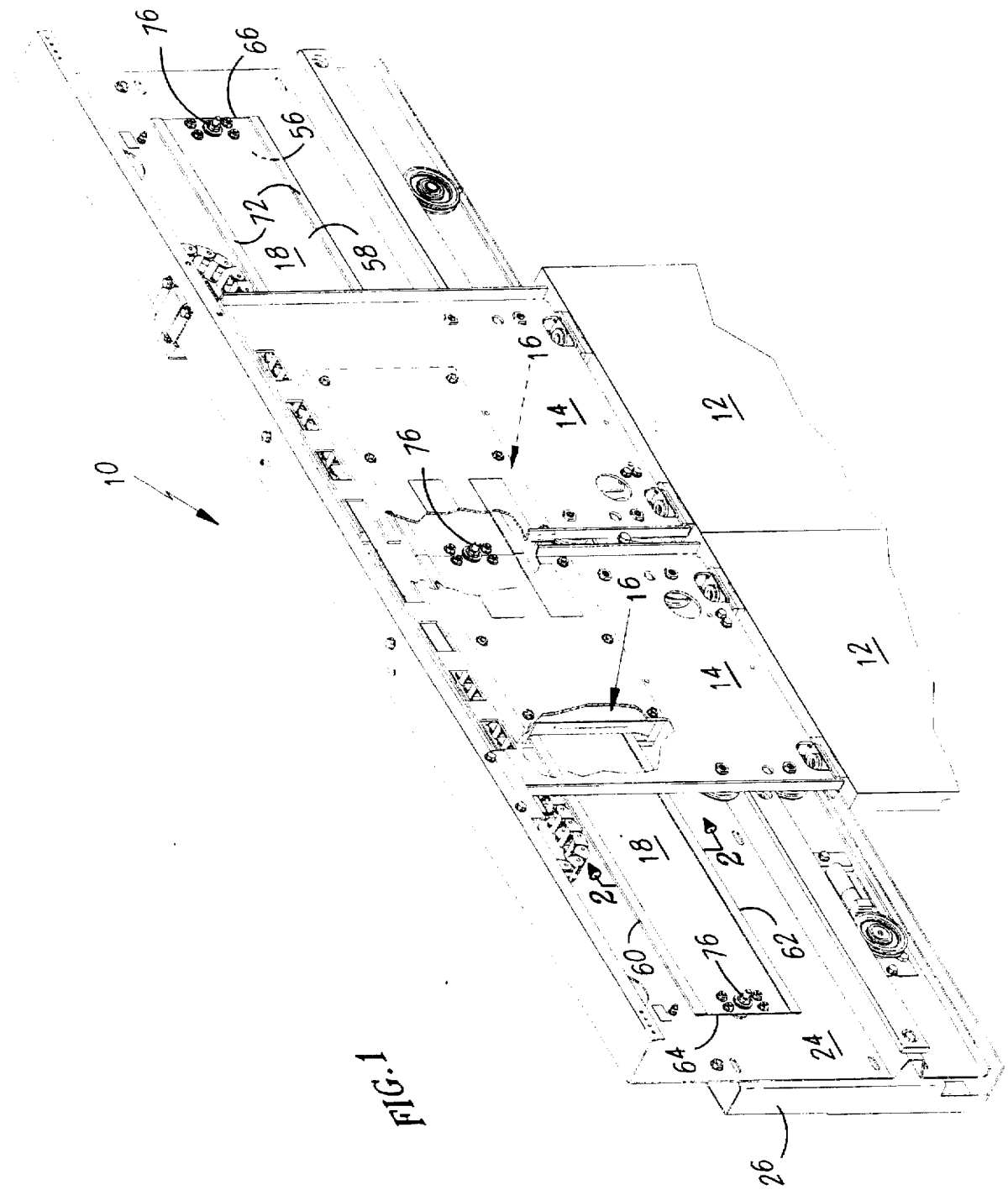

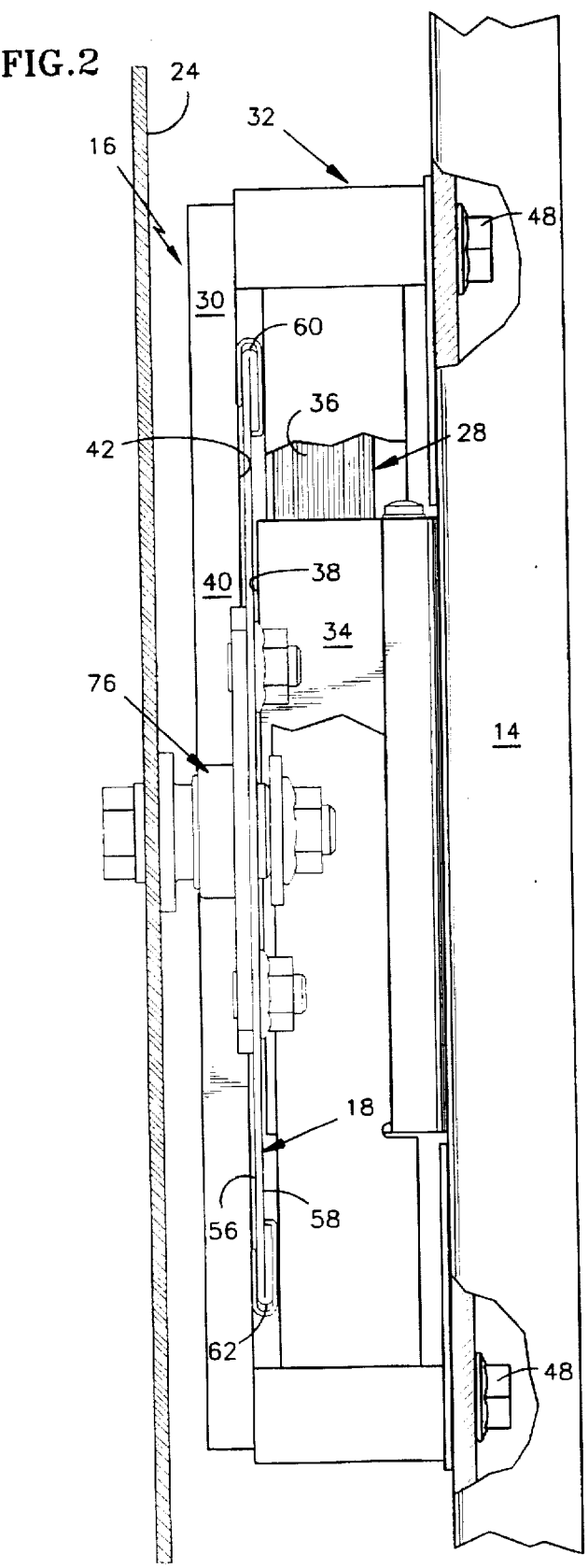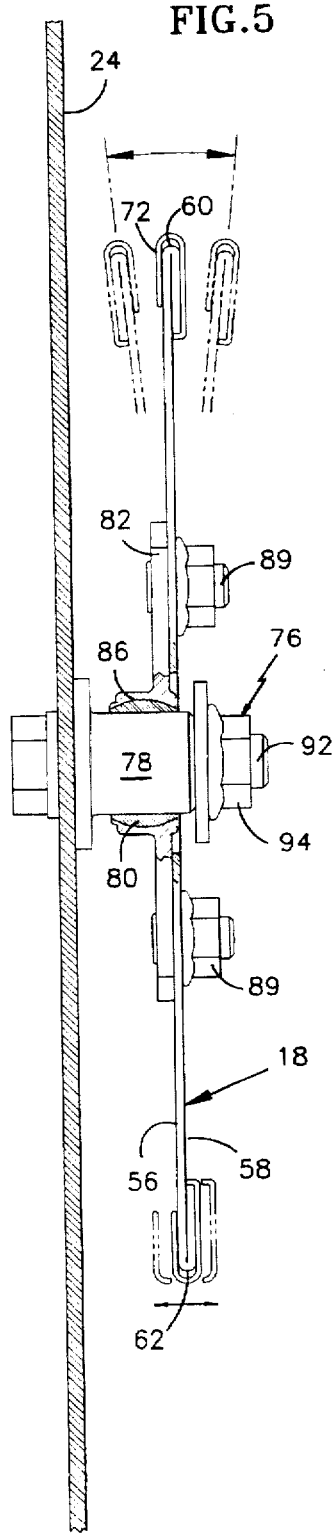

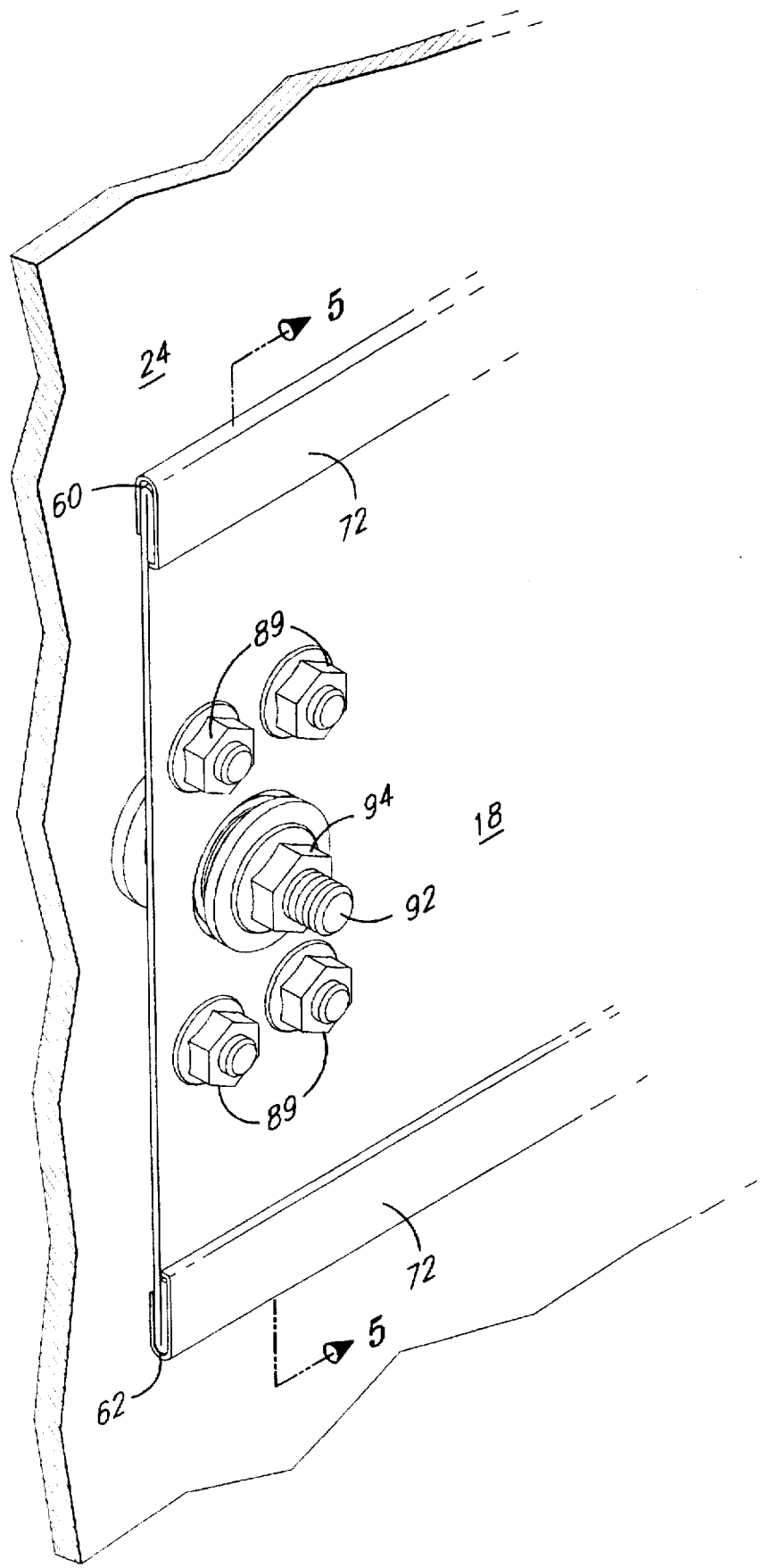

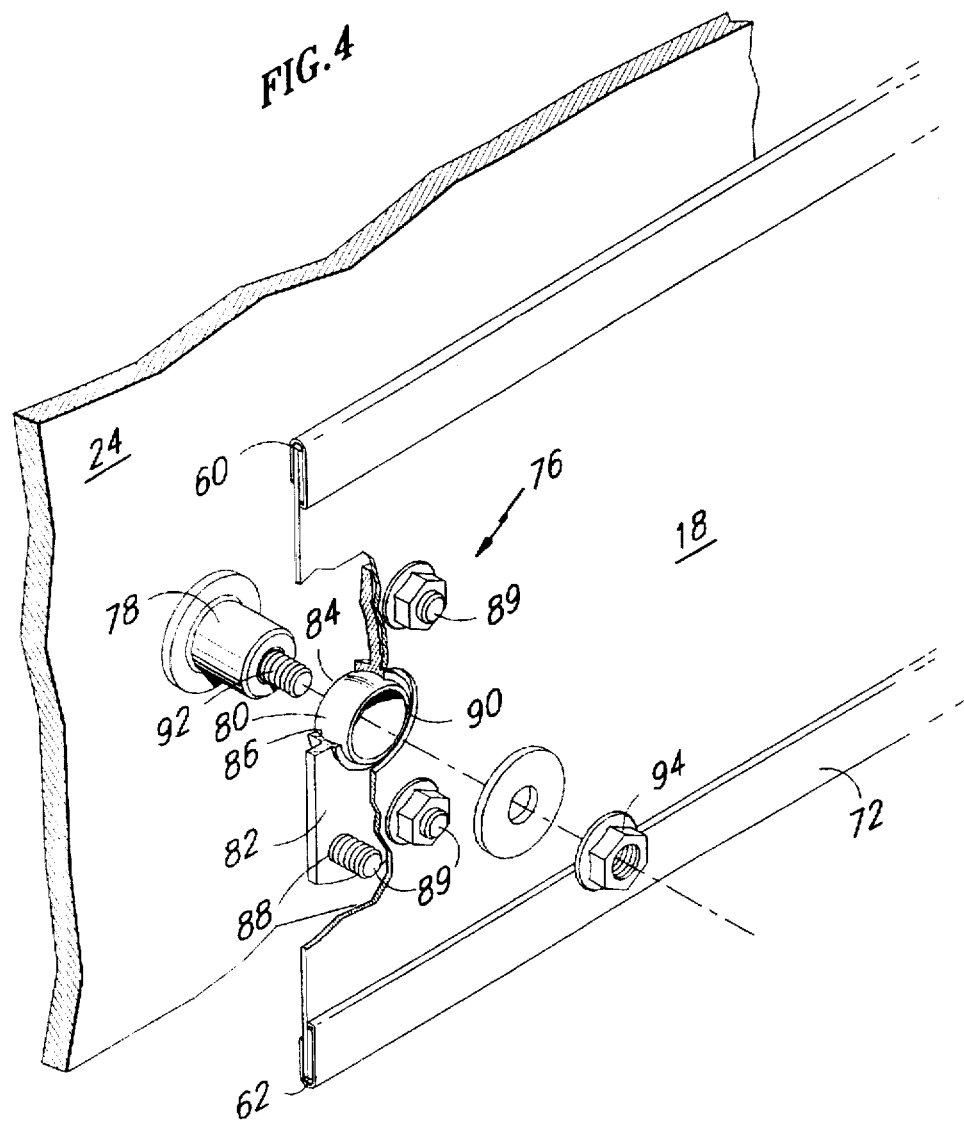

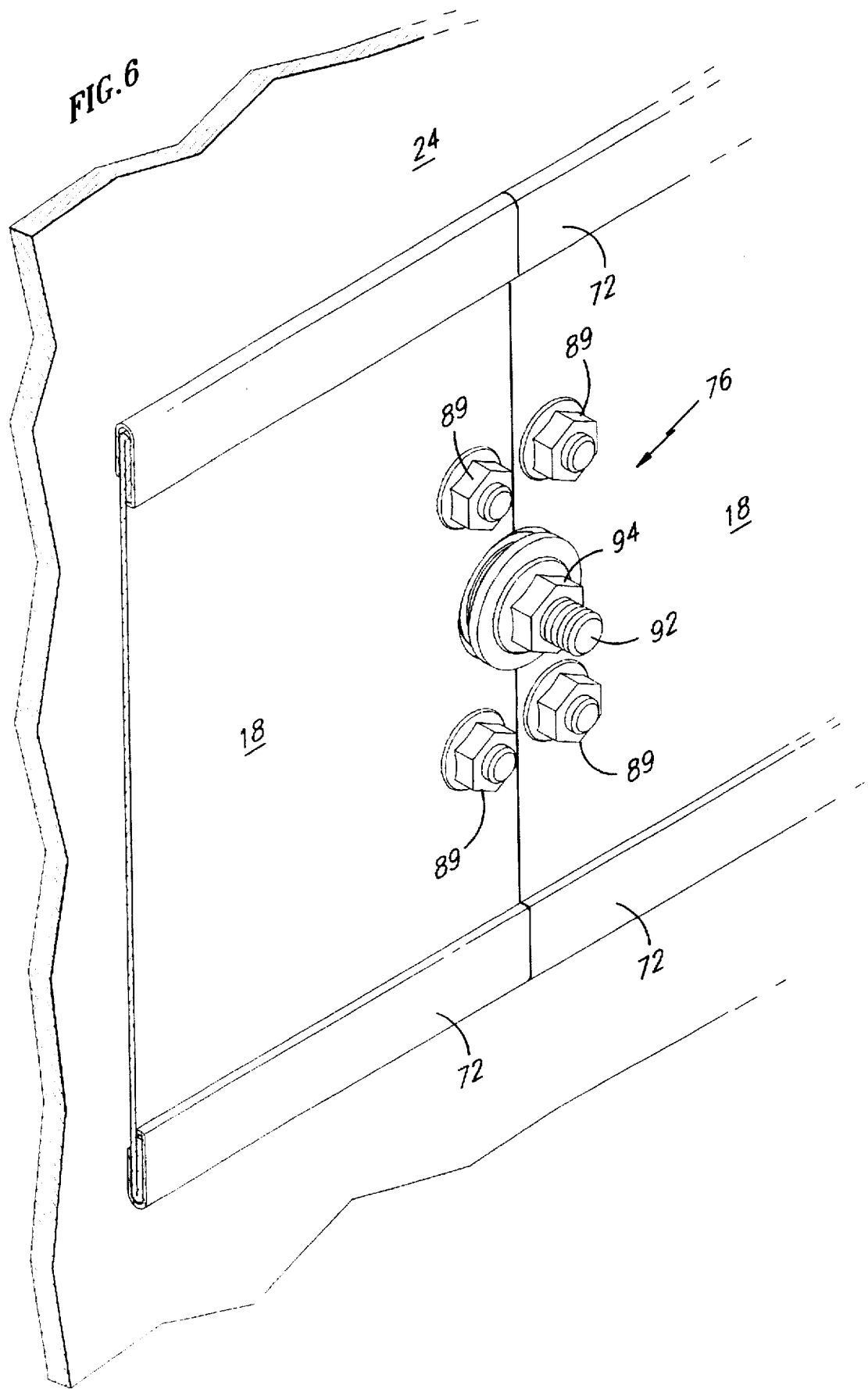

FLEXIBLE MOUNTING OF A MOTOR SECONDARY IN A LINEAR INDUCTION MOTOR FOR DRIVING ELEVATOR CAR DOORS

CROSS-REFERENCE TO RELATED APPLICATIONS

This application is related to commonly owned co-pending applications filed on the same day herewith having U.S. patent application Nos.: 08/746,274 (OT-2660) and 08/746,281.

TECHNICAL FIELD

The present invention relates to elevator systems and, more particularly, to high performance linear induction motors driving elevator car doors therefor.

BACKGROUND OF THE INVENTION

In conventional elevator systems, elevator car doors are selectively opened and closed by a rotary electric motor driving mechanical assemblies which typically include a plurality of moving parts such as gear boxes, a set of drive arms, and linkages. The major drawback to existing elevator car door systems is their susceptibility to misalignments, which necessitate adjustments and result in high maintenance costs. Also, the misalignments degrade the performance of the system such that the doors' opening and closing functions are not consistently smooth.

Linear motors potentially can provide an alternative to conventional door operating systems by eliminating the mechanical linkages and problems associated therewith. Linear motors typically include a motor primary unit and a motor secondary unit. However, despite the fact that the use of linear motors on door systems has been disclosed in various patents, including U.S. Pat. No. 1,881,014 to Ayers and U.S. Pat. No. 5,172,518 to Yoshino, many problems arise that make implementation of linear motors on doors unattractive. One problem encountered with linear motors used on elevator car doors is the difficulty in maintaining constant and small clearances between the motor secondary and the motor primary. The difficulty of maintaining these constant clearances is aggravated by the tendency of the elevator car doors to misalign and twist. Since one part of the linear motor is usually attached to the elevator car door or its hanger and the other part of the linear motor is attached to the elevator car, when the doors twist or move relative to the elevator car, the clearance between the parts of the motor changes.

U.S. Pat. No. 1,881,016 to Rose issued on Oct. 4, 1932 and entitled "Door Operating Mechanism" shows a linear motor having a motor primary and a motor secondary. The patent describes a flexible connection between the motor secondary and the door. Although the connection allows two dimensional flexibility such as limited pivoting of one end of the motor secondary in the vertical direction relative to the elevator car door, the pivot still does not compensate for any twisting motions of the door that may occur. Thus, if the Rose configuration is used in elevator car door systems, any twisting motion of the doors would jeopardize the proper operation of the linear motion since the linear motor would not be able to conform to the twisting motion of the doors. Therefore, in order to implement linear motors on elevator car doors, a mechanism for allowing flexibility and relative motion between the linear motor and the elevator car door is required.

Disclosure of the Invention

It is an object of the present invention to improve the performance of a linear induction motor used for opening and closing elevator car doors in an elevator system.

It is an object of the present invention to compensate for misalignment and twisting of elevator car doors in an elevator system using a linear induction motor for opening and closing elevator car doors.

According to the present invention, a linear induction motor for opening and closing elevator car doors in an elevator system includes a motor primary disposed on a door hanger and moving therewith and a motor secondary attached onto a header bracket of the elevator car by means of a plurality of swivel joints. The motor secondary extends the length of the door travel with the swivel joint securing each end of the motor secondary to the elevator car. The swivel joints allow multi-dimensional flexibility of the motor secondary to compensate for possible misalignment and twisting of the elevator car doors and of the motor primary attached onto the elevator car door hangers. Therefore, even during misalignment and twisting of the elevator car doors, the motor secondary and the motor primary maintain constant clearances therebetween.

One benefit of the present invention is that the swivel joints, disposed centrally at each end of the motor secondary, allow centralization of thrust forces applied from the motor primary to the motor secondary without producing a moment about the motor secondary.

The foregoing and other advantages of the present invention become more apparent in light of the following detailed description of the exemplary embodiments thereof, as illustrated in the accompanying drawings.

BRIEF DESCRIPTION OF THE DRAWINGS

FIG. 1 is a schematic, partially cut-away, perspective view of an elevator car door system driven by a linear induction motor;

FIG. 2 is a schematic, partially cut-away, side view of the linear induction motor of FIG. 1 taken along line 2—2;

FIG. 3 is an enlarged, schematic, perspective view of a motor secondary of the linear induction motor of FIG. 2 attaching onto a header bracket by means of a swivel joint, according to the present invention;

FIG. 4 is an exploded, cut-away, schematic, perspective view of the motor secondary of FIG. 3 attaching to the header bracket by means of the swivel joint;

FIG. 5 is a cut-away, schematic, cross-sectional, side view of the motor secondary of FIG. 3 taken along line 5—5 showing movement of the motor secondary relative to the header bracket; and FIG. 6 is a schematic, perspective view of two halves of the motor secondary of FIG. 3 joined by the swivel joint.

BEST MODE FOR CARRYING OUT THE INVENTION

Referring to FIG. 1, an elevator car door operating system 10 for opening and closing a pair of elevator car doors 12 that are suspended from a pair of door hangers 14 includes a pair of motor primaries 16 fixedly attached to the pair of door hangers 14 and a motor secondary 18 attached to a header bracket 24 secured to a cab facia 26 of the elevator car (not shown).

Referring to FIG. 2, each of the motor primaries 16 includes a primary winding 28 and a backiron 30 spaced apart from the primary winding 28 by a plurality of motor spacers 32. The primary winding 28 includes a primary iron 34 unit with winding 36 wrapped around it and a primary surface 38 facing the backiron 30. The backiron 30 includes an iron plate 40 having a backiron surface 42 facing the primary winding 28. A magnetic air gap is defined between the primary surface 38 and the backiron surface 42.

Each motor primary 16 is fixedly attached to the door hangers 14 by means of a plurality of bolts 48 passing through the backiron 30 and the motor spacers 32.

The motor secondary 18 extends the length of the elevator car door travel and fits between the backiron 30 and the primary winding 28 as the motor primaries 16 move during opening and closing of the elevator car doors 12. Referring to FIG. 3, the motor secondary 18 comprises a substantially flat plate having a first and a second faces 56, 58 bounded by a top and a bottom longitudinal edges 60, 62 extending the length of the motor secondary 18 and by a first and second vertical ends 64, 66. A secondary guide 72 is placed over each longitudinal edge 60, 62 of the motor secondary 18.

The motor secondary 18 is movably attached to the header bracket 24 at two ends 64, 66 and at the center thereof, as best seen in FIG. 1. The motor secondary 18 is mounted to the header bracket by means of swivel joints 76 allowing the motor secondary to move in and out of plane and to rotate about the joints 76, as best seen in FIGS. 1 and 5. The swivel joints 76 also function as standoffs to allow the backiron 30 to travel between the header bracket 24 and the motor secondary 18.

Referring to FIG. 4, the swivel joint 76 assembly includes a shaft 78, one end of which is fixedly secured to the header bracket 24. A swivel ball 80 rides along the shaft 78, as best seen in FIG. 5. A mounting bracket 82 includes a central opening 84 with a rounded flange 86 for fitting over the swivel ball 80 and a plurality of holes 88 for securing the swivel joint 76 to the motor secondary 18 by means of plurality of bolts 89. An opening 90 formed within the motor secondary 18 is in register with the central opening 84 of the mounting bracket 82 and allows the shaft 78 to pass therethrough. A bolt 92 passes through the center of the shaft 78 with a nut 94 securing the swivel joint 76 assembly onto the header bracket 24 and the motor secondary 18. The swivel joint 76 shown herein is of standard type and is readily available from various manufacturers including Triangle Manufacturing Company of Oshkosh, Wis.

Referring to FIG. 5, the swivel joints 76 allow movement of the motor secondary 18 with respect to the header bracket 24. As the swivel ball 80 rides along the shaft, the motor secondary 18 can move in and out of the plane defined by the motor secondary 18. As the rounded flange 86 of the mounting bracket 82 fits over the swivel ball 80, the motor secondary 18, attached to the mounting bracket 24, can rotate about the three swivel joints. The only restricted motion is the horizontal motion, in the direction of thrust, within the plane defined by the motor secondary.

When the doors 12 open and close, the swivel joints 76 isolate the motor from possible misalignment or impact. If the doors are either misaligned or impacted, such misalignments and impacts are transmitted to the door hangers 14 and also to the motor primary 16 that is fixedly attached to the door hanger 14. When the motor primary 16 moves in and out of plane, or is twisted, the motor secondary 18 also moves about the swivel joints 76 so that the running clearances between the motor primary 16 and the motor secondary 18 remain constant.

Another benefit of the present invention is that the swivel joints 76 are disposed centrally between the top longitudinal edge 60 and the bottom longitudinal edge 62 at each end 64, 66 of the motor secondary 18 and allow centralization of thrust forces applied from the motor primary 16 to the motor secondary without producing a moment about the motor secondary.

Referring to FIG. 6, an additional benefit of the present invention is that if the door travel is too long for a single motor secondary, a pair of motor secondaries can be used with the central swivel joint being used as a joining mechanism. Two bolts 89 of the mounting bracket 82 can attach to one motor secondary and two bolts 89 can attach to the other motor secondary.

While the present invention has been illustrated and described with respect to a particular embodiment thereof, it should be appreciated by those of ordinary skill in the art, that various modifications to this invention may be made without departing from the spirit and scope of the present invention. For example, the best mode embodiment described herein depicts a central opening biparting two door system with two motor primaries, a motor secondary and three swivel joints. For a single door configuration with a single motor primary, only two swivel joints on each end of the motor secondary would be used.

We claim:

1. An elevator car door operating system for opening and closing an elevator car door in an elevator system includes a door hanger for suspending said elevator car door therefrom, said door hanger being movably secured onto a header bracket attached to an elevator car, said elevator car door operating system comprising:

a motor primary unit fixedly attaching onto said door hanger;

a motor secondary extending the length of the door travel of said elevator car door, said motor secondary having a first vertical end and a second vertical end and a top and bottom longitudinal edges, said motor secondary cooperating with said motor primary to generate thrust; and a plurality of swivel joints attaching each said vertical end of said motor secondary onto said header bracket to allow a wide range of motions for said motor secondary with respect to said header bracket, thereby compensating for misalignment or twisting of said elevator car door.

2. The elevator car door operating system according to claim 1 wherein said plurality of swivel joints is disposed substantially centrally between said top and bottom longitudinal edges of said motor secondary to centralize thrust forces applied from said motor primary and to minimize a moment about said motor secondary.

3. The elevator car door operating system according to claim 1 wherein each of said plurality of swivel joints also functions as a standoff to space said motor secondary from said header bracket to allow said backiron to fit therebetween.

4. The elevator car door operating system according to claim 1 wherein said motor primary unit includes a primary winding spaced apart from a backiron by means of a plurality of spacers and defining a magnetic gap therebetween, and wherein said motor secondary fits between said primary winding and said backiron.

5. An elevator car door operating system for opening and closing a first elevator car door and a second elevator car door in an elevator system includes a first and a second door hangers for suspending said elevator car doors therefrom, said door hangers being movably secured onto a header bracket attached to an elevator car, said elevator car door operating system comprising:
- a first motor primary unit fixedly attaching onto said first door hanger;
- a second motor primary unit fixedly attaching onto said second door hanger;
- a motor secondary extending the length of the door travel of said elevator car doors, said motor secondary having a first and a second vertical ends and a top and bottom longitudinal edges, said motor secondary cooperating with said first and second motor primary to generate thrust; and
- a plurality of swivel joints attaching each said vertical end of said motor secondary onto said header bracket to allow a wide range of motions for said motor secondary with respect to said header bracket, thereby compensating for any misalignment or twisting of said elevator car doors.

6. The elevator car door operating system according to claim 5 wherein:
- said motor secondary is split vertically into a first half and a second half and forms a first split end and a second split end; and
- a central swivel joint joins said first split end and said second split end and attaches said first half and said second half of said motor secondary onto said header bracket to allow a wide range of motions for said motor secondary.

* * * * *